United States Patent
Balsiger et al.

(10) Patent No.: US 12,480,567 B2
(45) Date of Patent: Nov. 25, 2025

(54) HARMONIC GEAR SYSTEMS HAVING REDUNDANT LOAD PATHS BETWEEN INPUT AND OUTPUT SHAFTS

(71) Applicant: Hamilton Sundstrand Corporation, Charlotte, NC (US)

(72) Inventors: Derick Balsiger, Prescott Valley, AZ (US); Keith A. Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/443,864

(22) Filed: Feb. 16, 2024

(65) Prior Publication Data

US 2025/0264152 A1   Aug. 21, 2025

(51) Int. Cl.
*F16H 49/00* (2006.01)
*F16C 19/18* (2006.01)

(52) U.S. Cl.
CPC ........... *F16H 49/001* (2013.01); *F16C 19/18* (2013.01); *F16C 2361/00* (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS

| | | | | |
|---|---|---|---|---|
| 4,237,751 A * | 12/1980 | Davis | .................... | F16H 49/001 416/170 R |
| 9,157,517 B2 * | 10/2015 | Lunin | ................... | F16H 49/001 |
| 9,528,587 B2 * | 12/2016 | Balsiger | ................ | F16H 49/001 |
| 9,605,742 B2 | 3/2017 | Lin | | |
| 10,030,756 B2 | 7/2018 | Wilkens | | |
| 11,614,153 B2 | 3/2023 | Ling | | |
| 2021/0131544 A1 * | 5/2021 | Balsiger | ................ | F16H 49/001 |

FOREIGN PATENT DOCUMENTS

| | | |
|---|---|---|
| CN | 106090183 A | 11/2016 |
| CN | 113339478 A | 9/2021 |
| DE | 19913778 A1 * | 9/2000 ........... F16H 49/001 |
| DE | 102016116438 B3 | 1/2018 |
| EP | 3892889 A1 | 10/2021 |
| JP | H034054 A | 1/1991 |
| JP | 2013194836 A | 9/2013 |
| SU | 578515 A1 | 10/1977 |

OTHER PUBLICATIONS

Extended European Seach Report for EP Application No. 25156109.8. dated Jun. 17, 2025, pp. 1-11.

* cited by examiner

*Primary Examiner* — Jake Cook
(74) *Attorney, Agent, or Firm* — CANTOR COLBURN LLP (57) ABSTRACT

A harmonic gear system, having: a housing; an input shaft having an aft end within the housing that defines a wave generator; a wave generator bearing; first and second nested cup-shaped flex splines that are grounded to the housing, the first and second flex splines are biased by the wave generator via the wave generator bearing; an output shaft having a forward end that is within the housing, and a radial flange at the forward end; first and second nested circular splined shafts within the housing, the first and second circular splined shafts are connected to the radial flange of the output shaft and are driven by ones of the first and second flex splines, to thereby drive the output shaft; and a bearing between the first and second circular splined shafts.

9 Claims, 9 Drawing Sheets

HARMONIC GEAR SYSTEMS HAVING REDUNDANT LOAD PATHS BETWEEN INPUT AND OUTPUT SHAFTS

BACKGROUND

The embodiments are directed to harmonic gear systems and more specifically to harmonic gears systems having redundant load paths between input and output shafts.

To meet safety codes and standards, actuation systems such as found in aircrafts may require a dual load path (or drive paths) between an input shaft and an output shaft to provide redundancy and a lack of disconnect after a failure of one of the load paths.

BRIEF SUMMARY

Disclosed is a harmonic gear system, including: a housing having forward and aft ends; an input shaft having a forward end that is forward of the housing, and an aft end that is within the housing, wherein the aft end defines a wave generator; a wave generator bearing surrounding the wave generator; first and second cup-shaped flex splines, wherein the second flex spline is nested within the first flex spline, and the first and second flex splines are grounded to the forward end of the housing, and the first and second flex splines are simultaneously biased by the wave generator via the wave generator bearing; an output shaft having a forward end that is within the housing and an aft end that is aft of the housing, and a radial flange at the forward end; first and second circular splined shafts, within the housing, wherein the second circular splined shaft is nested within the first circular splined shaft, and the first and second circular splined shafts are connected to the radial flange of the output shaft and are driven by ones of the first and second flex splines, to thereby drive the output shaft; and a bearing between the first and second circular splined shafts.

In addition to one or more aspects of the system, or as an alternate, the wave generator extends from a forward end to an aft end; the first flex spline has: a forward end that is connected to the forward end of the housing; and an aft end, axially located at the forward end of the wave generator, that has an outer surface that is splined and an inner surface that is biased by the forward end of the wave generator; and the second flex spline has: a forward end that is connected to the forward end of the housing; and an aft end, axially located at the aft end of the wave generator, that has an outer surface that is splined, and an inner surface that is biased by the aft end of the wave generator.

In addition to one or more aspects of the system, or as an alternate, the first flex spline includes: a radially extending base at the forward end that defines a center aperture through which the input shaft extends; and an axially extending wall that extends aft from the base to the aft end of the first flex spline; and the second flex spline includes: a radially extending base at the forward end that defines a center aperture through which the input shaft extends; and an axially extending wall that extends aft from the base to the aft end of the second flex spline.

In addition to one or more aspects of the system, or as an alternate, the base of the first flex spline is secured to the forward end of the housing; and the base of the second flex spline is secured to the forward end of the housing via the base of the first flex spline; and the second flex spline is axially longer than the first flex spline, so that the aft ends of the first and second flex splines are axially adjacent to each other.

In addition to one or more aspects of the system, or as an alternate, the first circular splined shaft includes: a forward end that is axially located at the aft end of the first flex spline, wherein the forward end of the first circular splined shaft has an inner surface that is splined and engages the spline of the aft end of the first flex spline; and an aft end connected to the radial flange of the output shaft; and the second circular splined shaft includes: a forward end that is axially located at the aft end of the second flex spline, wherein the forward end of the second circular splined shaft has an inner surface that is splined and engages the spline of the aft end of the second flex spline; and an aft end connected to the radial flange of the output shaft.

In addition to one or more aspects of the system, or as an alternate, the second circular splined shaft is longer than the first circular splined shaft, so that the forward ends of the first and second circular splined shafts are axially adjacent to each other.

In addition to one or more aspects of the system, or as an alternate, the system further includes a radial inner flange at the forward end of the first circular splined shaft, wherein the radial inner flange has the inner surface that is splined.

In addition to one or more aspects of the system, or as an alternate, the wave generator bearing extends from a forward end to an aft end; and the forward and aft ends of the wave generator bearing are clipped to the forward and aft ends of the wave generator.

In addition to one or more aspects of the system, or as an alternate, the system further includes forward roller bearings between the forward end of the input shaft and the forward end of the housing; aft roller bearings between the output shaft and the aft end of the housing; first inner roller bearings between the forward end of the first circular splined shaft and the housing; second inner roller bearings between the aft end of the first circular splined shaft and the housing; and third inner roller bearings between the aft end of the input shaft and the second circular splined shaft.

Disclosed is another harmonic gear system, including: a housing having forward and aft ends; an input shaft having a forward end that is forward of the housing, and an aft end that is within the housing, wherein the aft end defines a wave generator; a wave generator bearing surrounding the wave generator; a cup-shaped flex spline, grounded to the forward end of the housing, having first and second splines which are simultaneously biased by the wave generator via the wave generator bearing; an output shaft having a forward end that is within the housing and an aft end that is aft of the housing, and a radial flange at the forward end; first and second circular splined shafts, within the housing, wherein the second circular splined shaft is nested within the first circular splined shaft, and the first and second circular splined shafts are connected to the radial flange of the output shaft and are driven by ones of the first and second splines of the flex spline, to thereby drive the output shaft; and a bearing between the first and second circular splined shafts.

In addition to one or more aspects of the another system, or as an alternate, the system further includes the wave generator extends from a forward end to an aft end; and the flex spline includes: a forward end that is connected to the forward end of the housing; and an aft end that has an outer surface that has the first and second splines such that the first spline is axially located at the forward end of the wave generator and the second spline is axially located at the aft end of the wave generator, and an inner surface that is biased by the wave generator.

In addition to one or more aspects of the another system, or as an alternate, the flex spline includes a radially extending base at the forward end that defines a center aperture through which the input shaft extends; and an axially extending wall that extends aft from the base to the aft end of the flex spline.

In addition to one or more aspects of the another system, or as an alternate, the base of the flex spline is secured to the forward end of the housing.

In addition to one or more aspects of the another system, or as an alternate, the first circular splined shaft includes: a forward end that is axially located at the first spline of the flex spline, wherein the forward end of the first circular splined shaft has an inner surface that is splined and engages the first spline of the flex spline; and an aft end connected to the radial flange of the output shaft; and the second circular splined shaft includes: a forward end that is axially located at the second spline of the flex spline, wherein the forward end of the second circular splined shaft has an inner surface that is splined and engages the second spline of the flex spline; and an aft end connected to the radial flange of the output shaft.

In addition to one or more aspects of the another system, or as an alternate, the second circular splined shaft is longer than the first circular splined shaft, so that the forward ends of the first and second circular splined shafts are axially adjacent to each other.

In addition to one or more aspects of the another system, or as an alternate, the system includes a radial inner flange at the forward end of the first circular splined shaft, wherein the radial inner flange has the inner surface that is splined.

In addition to one or more aspects of the another system, or as an alternate, the wave generator bearing extends from a forward end to an aft end; and the forward and aft ends of the wave generator bearing are clipped to the forward and aft ends of the wave generator.

In addition to one or more aspects of the another system, or as an alternate, the system includes forward roller bearings between the forward end of the input shaft and the forward end of the housing; aft roller bearings between the output shaft and the aft end of the housing; first inner roller bearings between the forward end of the first circular splined shaft and the housing; second inner roller bearings between the aft end of the first circular splined shaft and the housing; and third inner roller bearings between the aft end of the input shaft and the second circular splined shaft.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
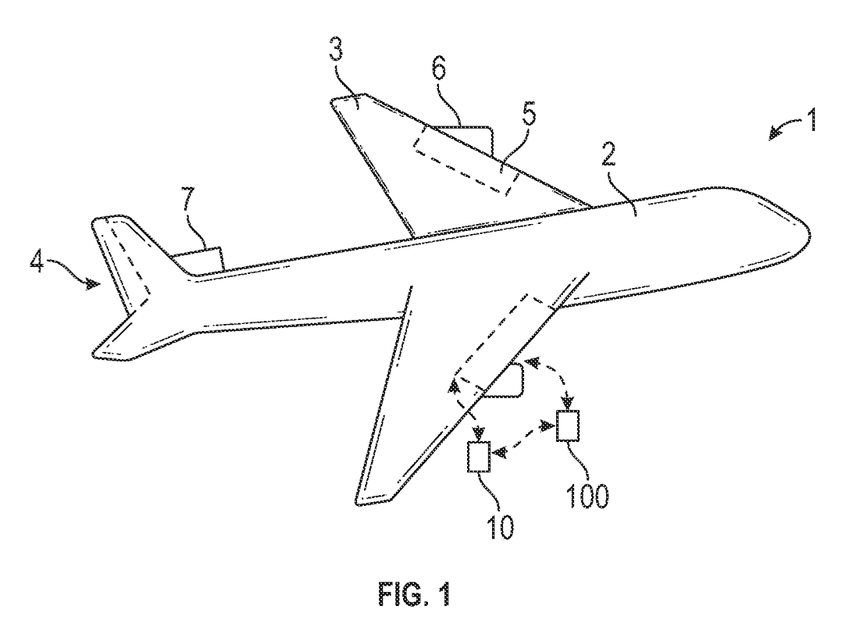
FIG. 1 shows an aircraft according to an embodiment.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. Movable parts such as the control surfaces 5 may be moved by a motor 10 via a drive such as a gear system 100. Disclosed herein are gear systems 100 that are harmonic gear systems having redundant load paths between an input shaft 120 and an output shaft 160. The disclosed systems provide redundancy and a lack of disconnect if there a failure of one of the load paths.

Figure 2:
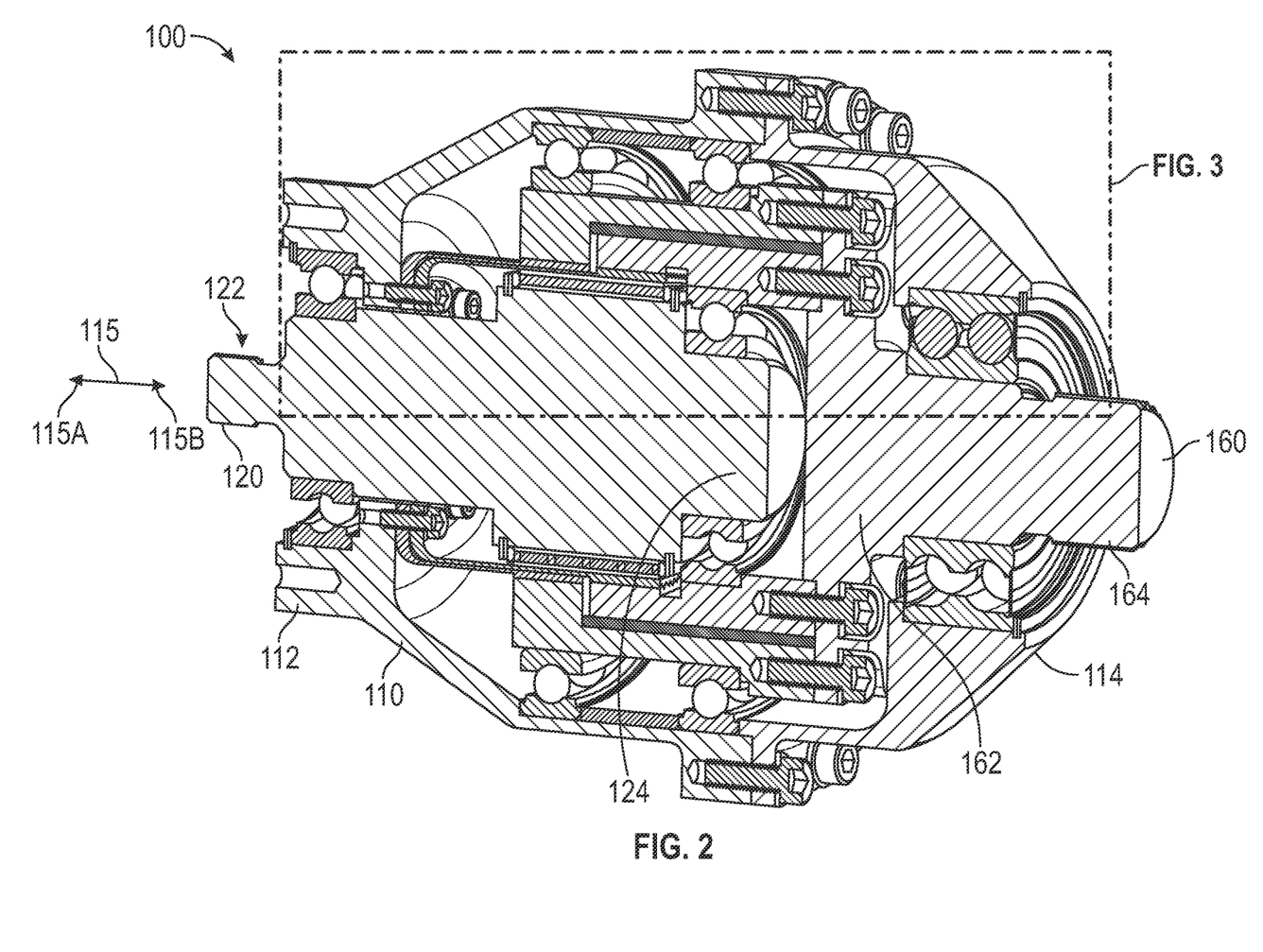
FIG. 2 shows a harmonic gear system having redundant flex splines, and an output shaft with redundant circular splined shafts, according to an embodiment.

Turning generally to FIG. 2, a harmonic (or strain wave) gear system 100 is disclosed according to an embodiment. The system 100 includes a housing 110 extending along an axis 115 (or axial direction, extending forward 115A and aft 115B) between forward and aft ends 112, 114. An input shaft 120 has a forward end 122 that is forward (outside) of the housing 110, and an aft end 124 that is within the housing 110. An output shaft 160 has a forward end 162 that is within the housing 110 and an aft end 164 that is aft (outside) of the housing 110.

Figure 3:
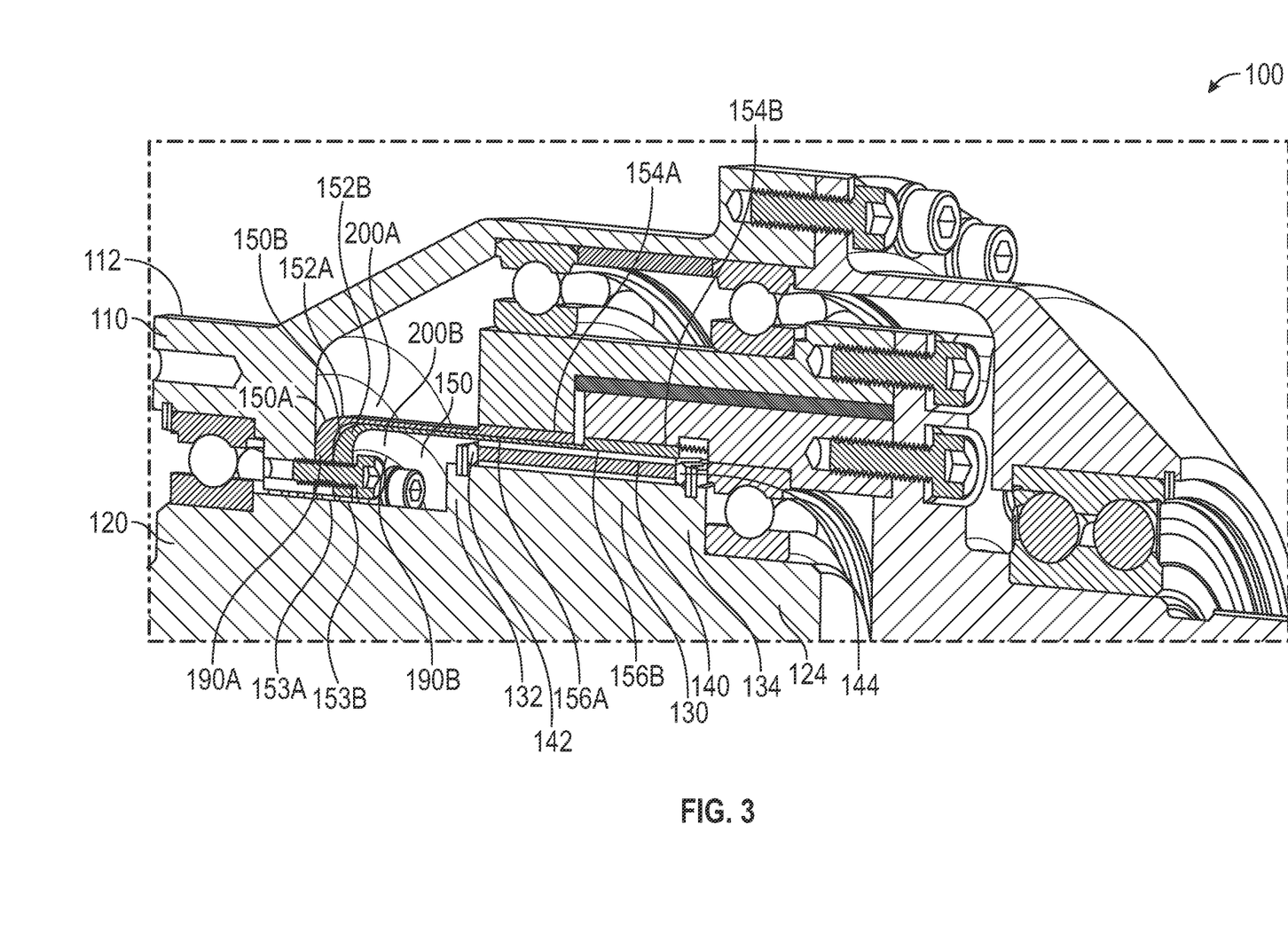
FIG. 3 shows a detail of the harmonic gear system of FIG. 2.

As shown in FIG. 3, the aft end 124 of the input shaft 120 defines a wave generator 130 that extends from forward to aft ends 132, 134. A wave generator bearing 140 surrounds the wave generator 130. The wave generator bearing 140 extends from a forward end 142 to an aft end 144. The forward and aft ends 142, 144 of the wave generator bearing 140 are clipped to the forward and aft ends 132, 134 of the wave generator 130.

The system 100 includes first and second cup-shaped flex splines 150A, 150B (generally 150). The second flex spline 150B is nested in the first flex spline 150A. The first and second flex splines 150 are grounded to the forward 112 end of the housing 110. The first and second flex splines 150 are simultaneously biased (flexed) by the wave generator 130 via the wave generator bearing 140.

More specifically, the first flex spline 150A has a forward end 152A that is connected to the forward end 112 of the housing 110. The first flex spline 150A has an aft end 154A that is axially located at the forward end 132 of the wave generator 130. The aft end 154A of the first flex spline 150A has an outer surface 155A (FIG. 4) that is splined 157A and an inner surface 156A that is biased by the forward end 132 of the wave generator 130.

The first flex spline 150A includes a radially extending base 190A at the forward end 152A that defines a center aperture 153A through which the input shaft 120 extends. The first flex spline 150A includes an axially extending wall 200A that extends aft from the base 190A to the aft end 154A of the first flex spline 150A. The base 190A of the first flex spline 150A is secured to the forward end 112 of the housing 110.

The second flex spline 150B has a forward end 152B that is connected to the forward end 112 of the housing 110. The second flex spline 150B has an aft end 154B that is axially located at the aft end 134 of the wave generator 130. The aft end 154B of the second flex spline 150B has an outer surface 155B (FIG. 4) that is splined 157B and an inner surface 156B that is biased by the aft end 134 of the wave generator 130. The configuration of the splines 157A, 157B are substantially the same as each other.

The second flex spline 150B includes a radially extending base 190B at the forward end 152B that defines a center aperture 153B through which the input shaft 120 extends. The second flex spline 150B includes an axially extending wall 200B that extends aft from the base 190B to the aft end 154B of the second flex spline. It is to be appreciated that the wall 200B of the second flex spline 150B, which is flexible, extends between the aft end 154A of the first spline 150 and the wave generator bearing 140. The base 190A of the second flex spline 150B is secured to the forward end 112 of the housing 110 via the base 190A of the first flex spline 150A.

The second flex spline 150B is axially longer than the first flex spline 150A. With this configuration, the aft ends 154A, 154B of the first and second flex splines 150 are axially adjacent to each other.

Figure 4:
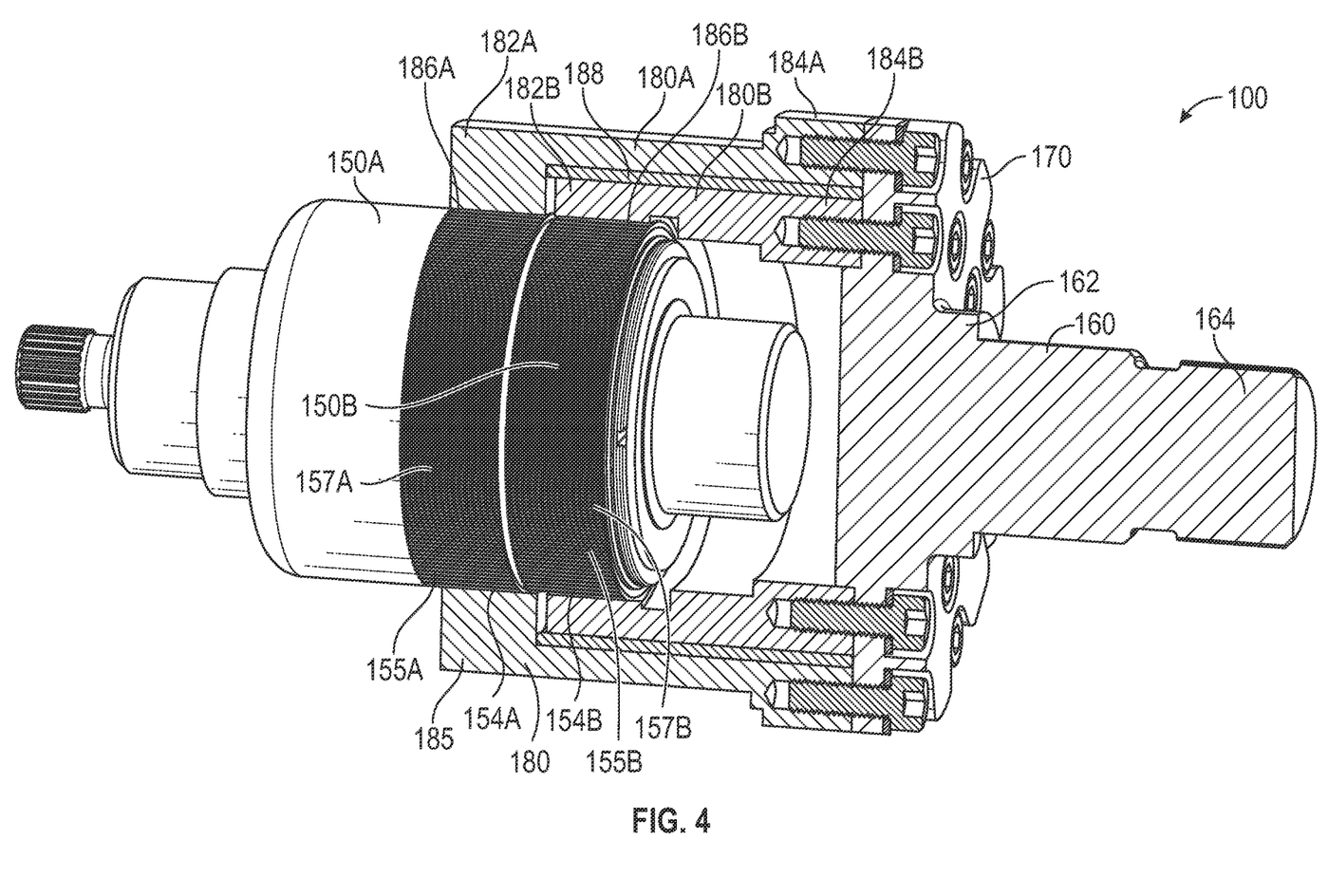
FIG. 4 shows, in isolation, from the system of FIG. of FIG. 2, the input shaft, the redundant flex splines, and the output shaft with the redundant circular splined shafts.

As shown in FIG. 4, a radial flange 170 is located at the forward end 162 of the output shaft 160. The system 100 includes first and second circular splined shafts 180A, 180B (generally 180) within the housing 110 (FIG. 2). The second circular splined shaft 180B is nested within the first circular splined shaft 180A. The first and second circular splined shafts 180 are connected to the radial flange 170 of the output shaft 160 and are driven by ones of the first and second flex splines 150. With this configuration, driving the first and second circular splined shafts 180 results in driving the output shaft 160.

The first circular splined shaft 180A has a forward end 182A that is axially located at the aft end 154A of the first flex spline 150A. The forward end 182A of the first circular splined shaft 180A has an inner surface 186A that is splined and engages the spline of the aft end 154A of the first flex spline 150A. The first circular splined shaft 180A has an aft end 184A connected to the radial flange 170 of the output shaft 160.

The second circular splined shaft 180B has a forward end 182A that is axially located at the aft end 184B of the second flex spline. The forward end 182B of the second circular splined shaft 180B has an inner surface 186B that is splined and engages the spline of the aft end 184B of the second flex spline. The second circular splined shaft 180B has an aft end 184B connected to the radial flange 170 of the output shaft 160. The configuration of the splines of the are circular splined shafts 180A, 180B are substantially the same as each other.

The second circular splined shaft 180B is longer than the first circular splined shaft. With this configuration, the forward ends 182A, 182B of the first and second circular splined shafts 180 are axially adjacent to each other.

A radial inner flange 185 is located at the forward end 182A of the first circular splined shaft. The radial inner flange 185 has the inner surface 186A of the first circular splined shaft 180A that is splined. With the inner flange 185, the first circular splined shaft 180 is cup-shaped.

A bearing 188, which may be a roller bearing, a plain bearing or a bushing as non-limiting examples, is between the first and second circular splined shafts 180. This prevents frictional binding between the first and second circular splined shafts 180 if one of the load paths breaks.

Figure 5:
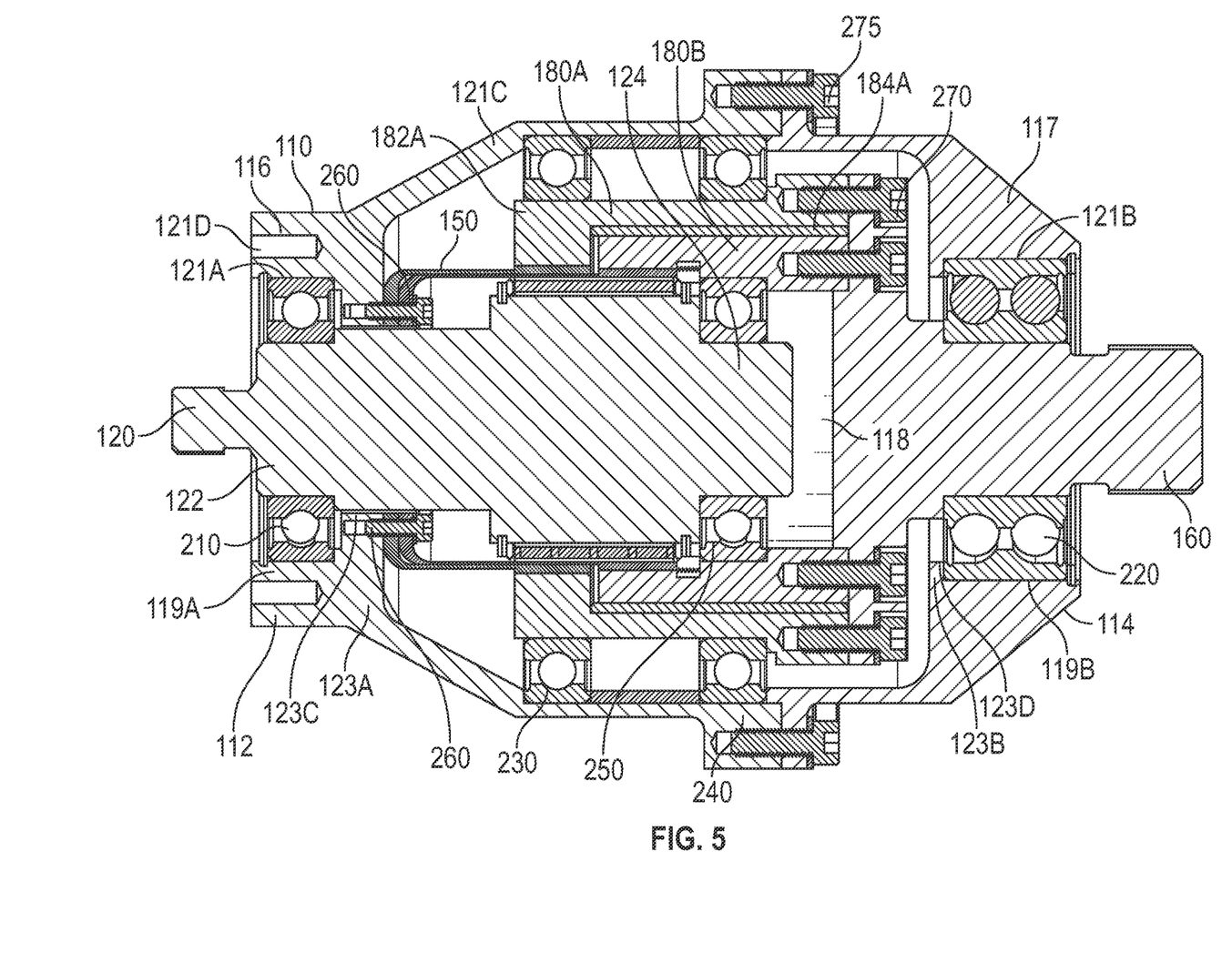
FIG. 5 identifies additional aspects of the harmonic gear system of FIG. 2, including bearings and a configuration of the system housing.

Turning to FIG. 5, forward roller bearings 210 are located between the forward end 122 of the input shaft 120 and the forward end 112 of the housing 110. aft roller bearings 220 are located between the output shaft 160 and the aft end 114 of the housing 110. First inner roller bearings 230 are located between the forward end 182A of the first circular splined shaft 180A and the housing 110. Second inner roller bearings 240 are located between the aft end 184A of the first circular splined shaft 180A and the housing 110. Third inner roller bearings 250 between the aft end 124 of the input shaft 120 and the second circular splined shaft 180B.

The flex splines 150 may be secured to the forward end 112 of the housing via forward fasteners 260, which may be bolts. The circular splined shafts 180 may be secured to the output shaft 160 via aft fasteners 270, which also may be bolts. The housing 110 may be formed of forward and aft sections 116, 117, which may be secured together via housing fasteners 275, which may also be bolts. The housing 110 may define a cavity 118 with forward and aft apertures 119A, 119B through which the input and output shafts 120, 160 extend. End surfaces 121A, 121B that define the apertures 119A, 119B may be utilized as radial seats for the forward and aft bearings 210, 220. An interior surface 121C that defines the cavity 118 may be utilized as a seat for the first and second inner bearings 230, 240. Axially facing apertures 121D in the forward end 112 of the housing 110 may be utilized for mounting the housing 110 to a stationary structure, e.g., in an aircraft 1 (FIG. 1). Forward and aft inner housing walls 123A, 123B may encase the cavity 118 and be utilized as axial seats for the forward and aft bearings 210, 220. The forward and aft inner housing walls 123A, 123B may define inner housing apertures 123C, 123D through which the input and output shafts 120, 160 extend. The flex splines 150 may be secured to the forward inner housing wall 123A with forward fasteners 260.

Figure 6:
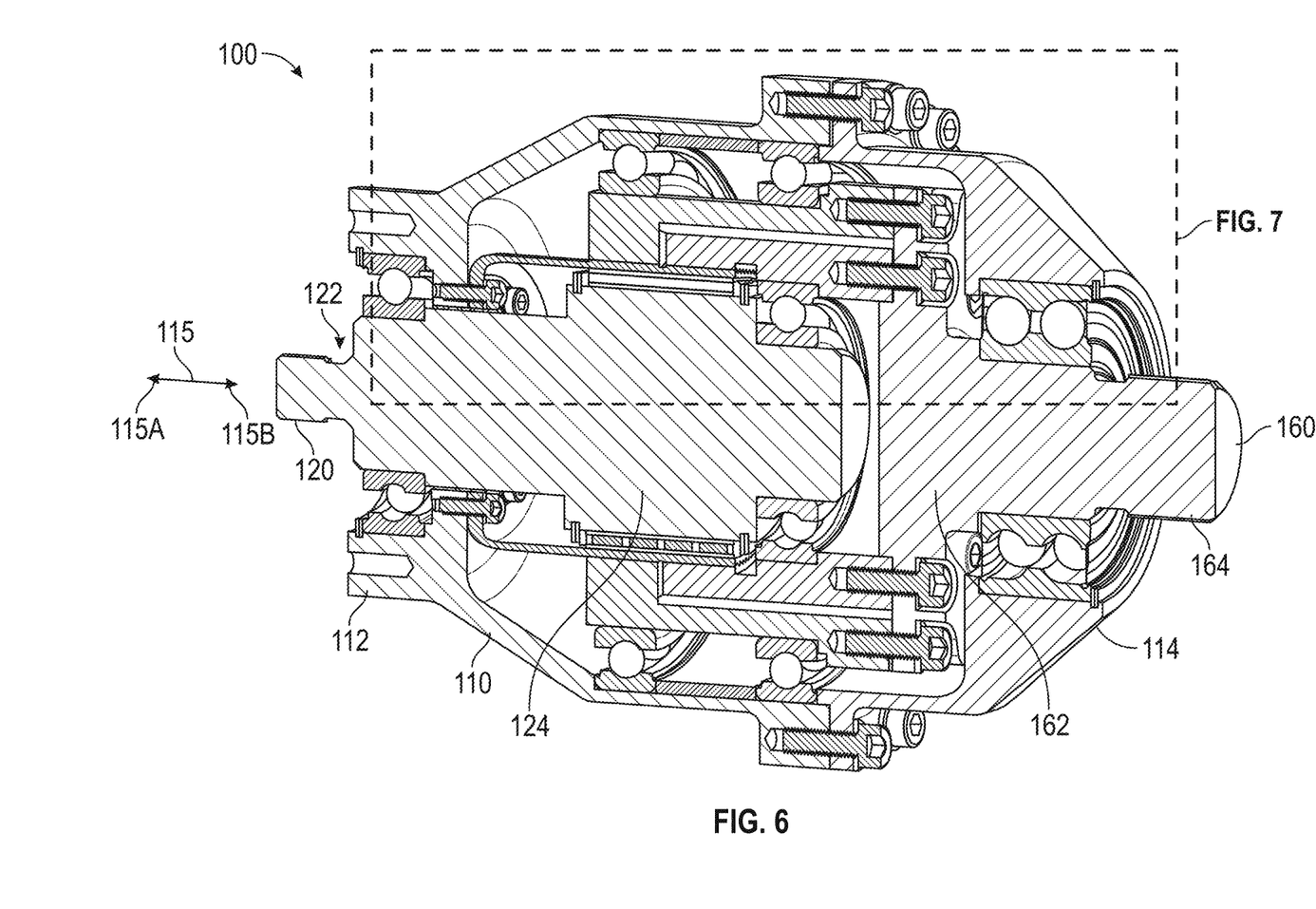
FIG. 6 shows a harmonic gear system having a flex spline with redundant splines, and an output shaft with redundant circular splined shafts, according to an embodiment.

In the above embodiments, each respective pair of flex splines 150 and circular splined shafts 180 defines a load path between the input shaft 120 and the output shaft 160. The above embodiment provides a harmonic gear system 100 with redundant flex splines 150, driven by an input shaft 120, that engage redundant circular splined shafts connected to an output shaft 160. Benefits include the removal of the possibility of a disconnect between input and output shaft 160 after failure of one the flex splines 150 or one of the circular splined shaft 180. Turning to FIG. 6, a harmonic (or strain wave) gear system 100 is disclosed according to another embodiment. The system 100 includes a housing 110 extending along an axis 115 (or axial direction, extending forward 115A and aft 115B) between forward and aft ends 112, 114. An input shaft 120 has a forward end 122 that is forward of the housing 110, and an aft end 124 that is within the housing 110. An output shaft 160 has a forward end 162 that is within the housing 110 and an aft end 164 that is aft of the housing 110.

Figure 7:
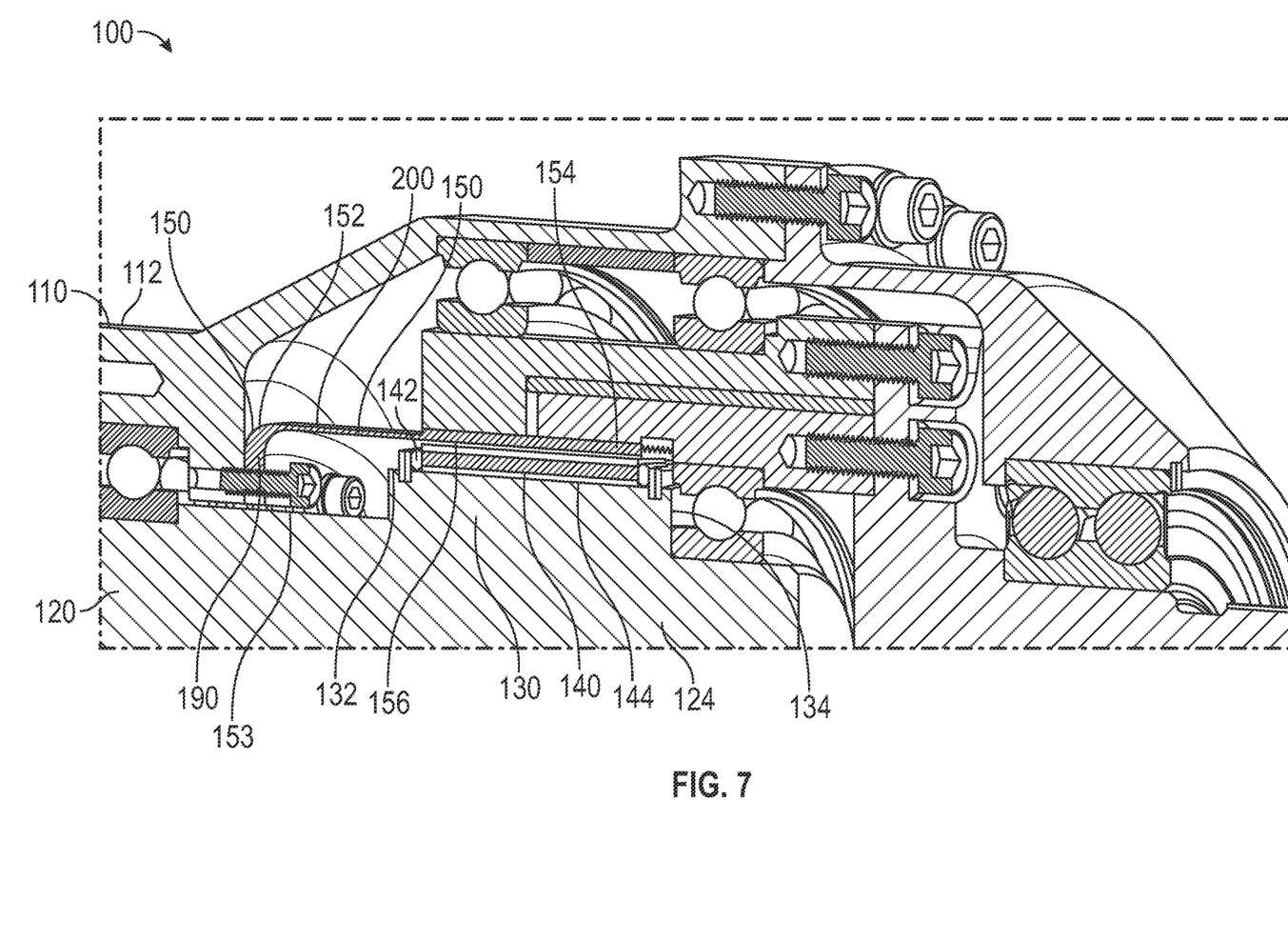
FIG. 7 shows a detail of the harmonic gear system of FIG. 6.

As shown in FIG. 7, the aft end 124 of the input shaft 120 defines a wave generator 130 that extends from forward to aft ends 132, 134. The wave generator bearing 140 extends from a forward end 142 to an aft end 144. The forward and aft ends 142, 144 of the wave generator bearing 140 are clipped to the forward and aft ends 132, 134 of the wave generator 130.

The system 100 includes a cup-shaped flex spline 150. The flex spline 150 is grounded to the forward end 112 of the housing 110. The flex spline 150 has first and second splines 157A, 157B (generally 157) (FIG. 8), which are simultaneously biased by the wave generator 130 via the wave generator bearing 140.

Figure 8:
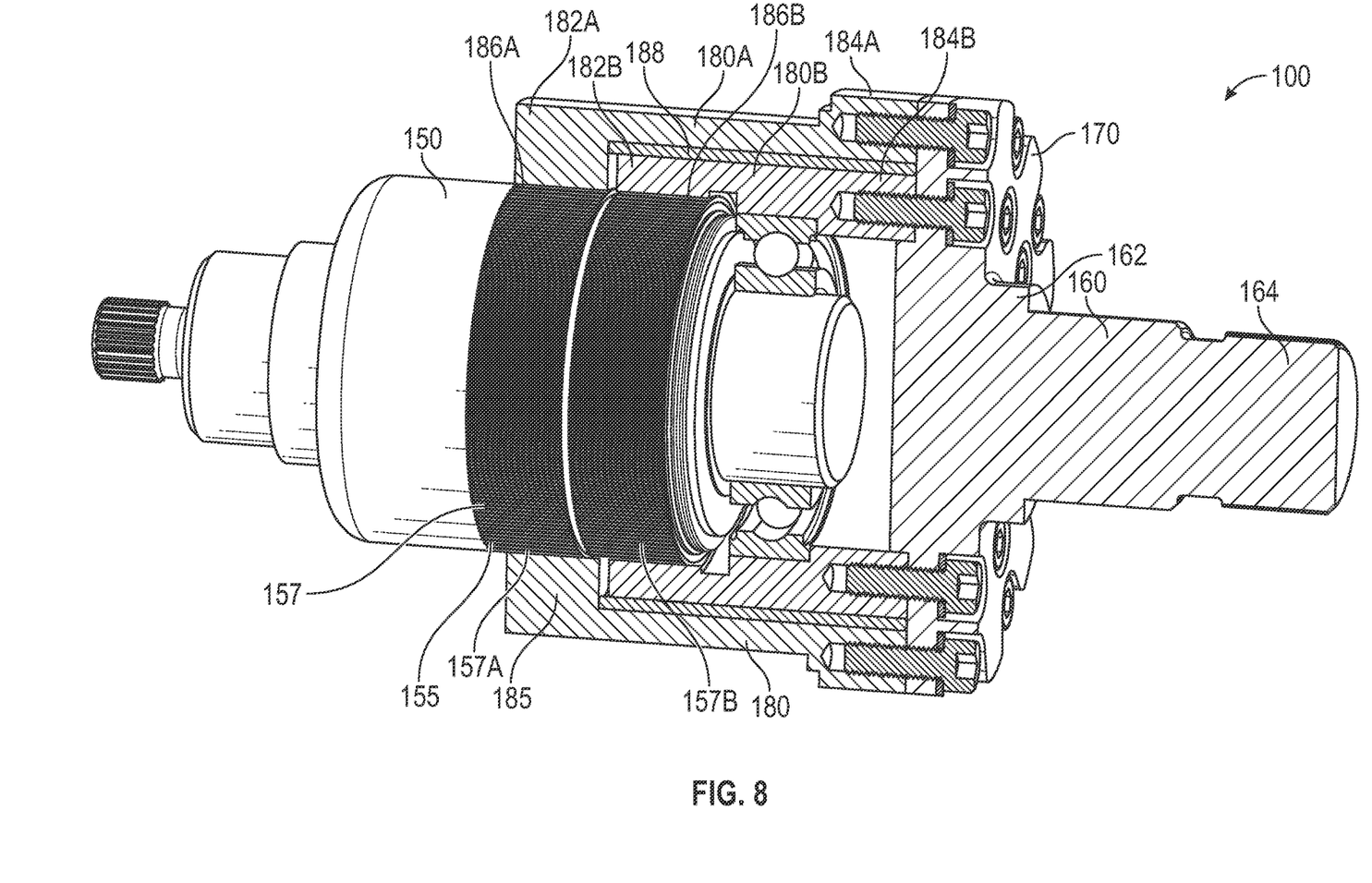
FIG. 8 shows, in isolation, from the system of FIG. of FIG. 6, the input shaft, the flex spline with redundant splines, and the output shaft with the redundant circular splined shafts.

More specifically, the flex spline 150 has a forward end 152 that is connected to the forward end 112 of the housing 110. The flex spline 150 has an aft end 154 that has an outer surface 155 (FIG. 8). The outer surface 155 has the first and second splines 157A, 157B. The first spline 157A is axially located at the forward end 132 of the wave generator 130 and the second spline 157B is axially located at the aft end 134 of the wave generator 130. The configuration of the splines 157A, 157B are substantially the same as each other. The flex spline 150 has an inner surface 156 that is biased by the wave generator 130.

The flex spline 150 includes a radially extending base 190 at the forward end 152 that defines a center aperture 153 through which the input shaft 120 extends. The flex spline 150 includes an axially extending wall 200 that extends aft from the base 190 to the aft end 154 of the flex spline. The base 190 of the flex spline 150 is secured to the forward end 112 of the housing 110.

As shown in FIG. 8, a radial flange 170 is located at the forward end 162 of the output shaft 160. The system 100 includes first and second circular splined shafts 180A, 180B (generally 180) within the housing 110 (FIG. 6). The second circular splined shaft 180B is nested within the first circular splined shaft. The first and second circular splined shafts 180 are connected to the radial flange 170 of the output shaft 160 and are driven by ones of the first and second splines 157 of the flex spline 150. With this configuration, driving the first and second circular splined shafts 180 results in driving the output shaft 160.

The first circular splined shaft 180A has a forward end 182A that is axially located at the first spline 157A of the flex spline. The forward end 182A of the first circular splined shaft 180A has an inner surface 186A that is splined and engages the first spline 157A of the flex spline. The first circular splined shaft 180A has an aft end 184A that is connected to the radial flange 170 of the output shaft 160.

The second circular splined shaft 180B has a forward end 184B that is axially located at the second spline 157B of the flex spline. The forward end 182B of the second circular splined shaft 180B has an inner surface 186B that is splined and engages the second spline 157B of the flex spline. An aft end 184B of the second circular splined shaft 180B is connected to the radial flange 170 of the output shaft 160. The configuration of the splines of the are circular splined shafts 180A, 180B are substantially the same as each other.

The second circular splined shaft 180B is longer than the first circular splined shaft. With this configuration, the forward ends 182A, 182B of the first and second circular splined shafts 180 are axially adjacent to each other.

A radial inner flange 185 is located at the forward end 182A of the first circular splined shaft. The radial inner flange 185 has the inner surface 186A of the first circular splined shaft 180A that is splined.

A bearing 188 is between the first and second circular splined shafts 180. This prevents frictional binding between the first and second circular splined shafts 180 if one of the load paths breaks.

Figure 9:
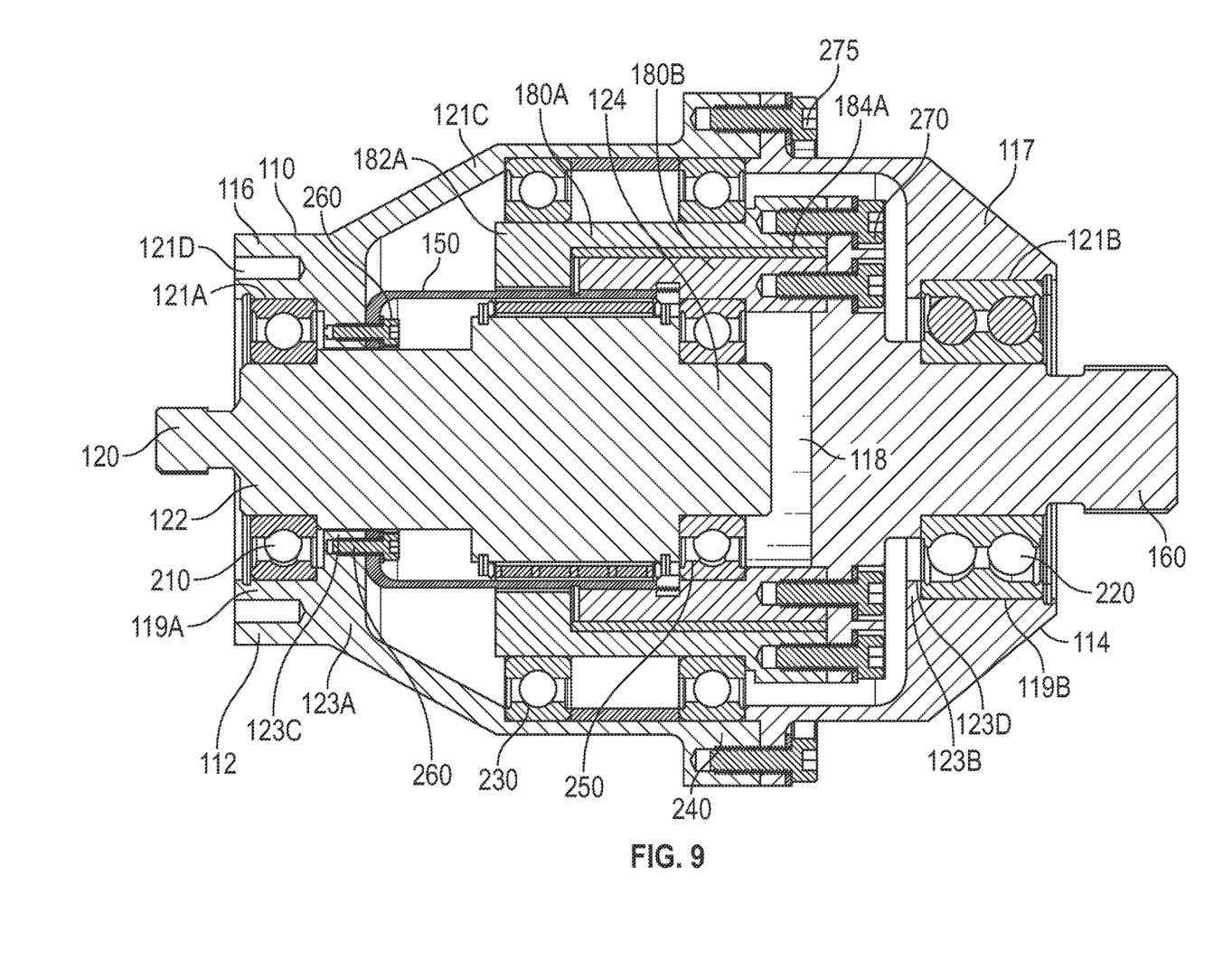
FIG. 9 identifies additional aspects of the harmonic gear system of FIG. 6, including bearings and a configuration of the system housing.

Turning to FIG. 9, forward roller bearings 210 are located between the forward end 122 of the input shaft 120 and the forward end 112 of the housing 110. aft roller bearings 220 are located between the output shaft 160 and the aft end 114 of the housing 110. First inner roller bearings 230 are located between the forward end 182A of the first circular splined shaft 180A and the housing 110. Second inner roller bearings 240 are located between the aft end 184A of the first circular splined shaft 180A and the housing 110. Third inner roller bearings 250 between the aft end 124 of the input shaft 120 and the second circular splined shaft 180B.

The flex splines 150 may be secured to the forward end 112 of the housing via forward fasteners 260, which may be bolts. The circular splined shafts 180 may be secured to the output shaft 160 via aft fasteners 270, which also may be bolts. The housing 110 may be formed of forward and aft sections 116, 117, which may be secured together via housing fasteners 275, which may also be bolts. The housing 110 may define a cavity 118 with forward and aft apertures 119A, 119B through which the input and output shafts 120, 160 extend. End surfaces 121A, 121B that define the apertures 119A, 119B may be utilized as radial seats for the forward and aft bearings 210, 220. An interior surface 121C that defines the cavity 118 may be utilized as a seat for the first and second inner bearings 230, 240. Axially facing apertures 121D in the forward end 112 of the housing 110 may be utilized for mounting the housing 110 to a stationary structure, e.g., in an aircraft 1 (FIG. 1). Forward and aft inner housing walls 123A, 123B may encase the cavity 118 and be utilized as axial seats for the forward and aft bearings 210, 220. The forward and aft inner housing walls 123A, 123B may define inner housing apertures 123C, 123D through which the input and output shafts 120, 160 extend. The flex spline 150 may be secured to the forward inner housing wall 123A via the forward fasteners 260.

In the above embodiments, each respective pair of splines 157 of the flex spline 150 and circular splined shafts 180 defines a load path between the input shaft 120 and the output shaft 160. The above embodiment provides a harmonic gear system 100 with a flex spline having redundant splines, driven by an input shaft 120, that engage redundant circular splined shafts of an output shaft 160. Benefits include the removal of the possibility of a disconnect between input and output shaft 160 after failure of one the circular splined shafts 180.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:
1. A harmonic gear system, comprising:
a housing having forward and aft ends;
an input shaft having a forward end that is forward of the housing, and an aft end that is within the housing, wherein the aft end defines a wave generator;
a wave generator bearing surrounding the wave generator;
first and second cup-shaped flex splines, wherein the second flex spline is nested within the first flex spline, and the first and second flex splines are grounded to the forward end of the housing, and the first and second flex splines are simultaneously biased by the wave generator via the wave generator bearing;

an output shaft having a forward end that is within the housing and an aft end that is aft of the housing, and a radial flange at the forward end;

first and second circular splined shafts, within the housing, wherein the second circular splined shaft is nested within the first circular splined shaft, and the first and second circular splined shafts are connected to the radial flange of the output shaft and are driven by ones of the first and second flex splines, to thereby drive the output shaft; and a bearing between the first and second circular splined shafts.

2. The system of claim 1, wherein:

the wave generator extends from a forward end to an aft end;

the first flex spline has:
  a forward end that is connected to the forward end of the housing; and
  an aft end, axially located at the forward end of the wave generator, that has an outer surface that is splined and an inner surface that is biased by the forward end of the wave generator; and the second flex spline has:
  a forward end that is connected to the forward end of the housing; and
  an aft end, axially located at the aft end of the wave generator, that has an outer surface that is splined, and an inner surface that is biased by the aft end of the wave generator.

3. The system of claim 2, wherein:

the first flex spline includes:
  a radially extending base at the forward end that defines a center aperture through which the input shaft extends; and
  an axially extending wall that extends aft from the base to the aft end of the first flex spline; and the second flex spline includes:
  a radially extending base at the forward end that defines a center aperture through which the input shaft extends; and
  an axially extending wall that extends aft from the base to the aft end of the second flex spline.

4. The system of claim 3, wherein:

the base of the first flex spline is secured to the forward end of the housing; and the base of the second flex spline is secured to the forward end of the housing via the base of the first flex spline; and the second flex spline is axially longer than the first flex spline, so that the aft ends of the first and second flex splines are axially adjacent to each other.

5. The system of claim 4, wherein the first circular splined shaft includes:
  a forward end that is axially located at the aft end of the first flex spline,
  wherein the forward end of the first circular splined shaft has an inner surface that is splined and engages the spline of the aft end of the first flex spline; and
  an aft end connected to the radial flange of the output shaft; and the second circular splined shaft includes:
  a forward end that is axially located at the aft end of the second flex spline,
  wherein the forward end of the second circular splined shaft has an inner surface that is splined and engages the spline of the aft end of the second flex spline; and
  an aft end connected to the radial flange of the output shaft.

6. The system of claim 5, wherein the second circular splined shaft is longer than the first circular splined shaft, so that the forward ends of the first and second circular splined shafts are axially adjacent to each other.

7. The system of claim 6, further including a radial inner flange at the forward end of the first circular splined shaft, wherein the radial inner flange has the inner surface that is splined.

8. The system of claim 7, wherein:

the wave generator bearing extends from a forward end to an aft end; and the forward and aft ends of the wave generator bearing are clipped to the forward and aft ends of the wave generator.

9. The system of claim 8, further including:

forward roller bearings between the forward end of the input shaft and the forward end of the housing;

aft roller bearings between the output shaft and the aft end of the housing;

first inner roller bearings between the forward end of the first circular splined shaft and the housing;

second inner roller bearings between the aft end of the first circular splined shaft and the housing; and third inner roller bearings between the aft end of the input shaft and the second circular splined shaft.

* * * * *